United States Patent
Li et al.

(10) Patent No.: US 10,298,864 B2
(45) Date of Patent: May 21, 2019

(54) MISMATCHED FOREIGN LIGHT DETECTION AND MITIGATION IN THE IMAGE FUSION OF A TWO-CAMERA SYSTEM

(71) Applicant: Apple Inc., Cupertino, CA (US)

(72) Inventors: Xiaoxing Li, San Jose, CA (US); Paul M. Hubel, Mountain View, CA (US); Marius Tico, Mountain View, CA (US); Lech J. Szumilas, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/617,503

(22) Filed: Jun. 8, 2017

(65) Prior Publication Data

US 2017/0359534 A1 Dec. 14, 2017

Related U.S. Application Data

(60) Provisional application No. 62/348,614, filed on Jun. 10, 2016.

(51) Int. Cl.
*H04N 5/228* (2006.01)
*H04N 9/73* (2006.01)
(Continued)

(52) U.S. Cl.
CPC ............. *H04N 5/3572* (2013.01); *G06T 5/50* (2013.01); *H04N 5/2258* (2013.01);
(Continued)

(58) Field of Classification Search
CPC ........ H04N 5/3572; H04N 5/217; H04N 3/23; H04N 1/00872; H04N 5/2258; G06T 5/006

See application file for complete search history.

(56) References Cited

U.S. PATENT DOCUMENTS 7,619,664 B2 11/2009 Pollard
8,442,349 B2 5/2013 Sarkijarvi
(Continued)

FOREIGN PATENT DOCUMENTS

JP 2015226144 A 12/2015

*Primary Examiner* — Daniel M Pasiewicz
*Assistant Examiner* — Selam T Gebriel
(74) *Attorney, Agent, or Firm* — Blank Rome LLP

(57) ABSTRACT

Foreign lighting effects, such as lens flare, are very common in natural images. In a two-camera-system, the two images may be fused together to generate one image of a better quality. However, there are frequently different foreign light patterns in the two images that form the image pair, e.g., due to the difference in lens design, sensor and position, etc. Directly fusing such pairs of images will result in non-photorealistic images, with composed foreign light patterns from both images from the image pair. This disclosure describes a general foreign light mitigation scheme to detect all kinds of foreign light region mismatches. The detected foreign light mismatch regions may be deemphasized or excluded in the fusion step, in order to create a fused image that keeps a natural-looking foreign light pattern that is close to what was seen by the user of an image capture device during an image capture preview mode.

24 Claims, 11 Drawing Sheets

(51) Int. Cl.
  *H04N 5/357* (2011.01)
  *H04N 5/225* (2006.01)
  *H04N 5/265* (2006.01)
  *G06T 5/50* (2006.01)
  *H04N 5/232* (2006.01)

(52) U.S. Cl.
  CPC ......... *H04N 5/23238* (2013.01); *H04N 5/265* (2013.01); *G06T 2207/20221* (2013.01)

(56) References Cited

U.S. PATENT DOCUMENTS

| | | |
|---|---|---|
| 8,730,356 B2 | 5/2014 | Ansfield |
| 2012/0268626 A1 | 10/2012 | Lu |
| 2013/0329132 A1 | 12/2013 | Tico |
| 2014/0071228 A1* | 3/2014 | Cho .................. H04N 5/23238 348/36 |
| 2015/0015750 A1* | 1/2015 | Stern ..................... H04N 9/045 348/281 |
| 2015/0042767 A1* | 2/2015 | Ciurea ............... H04N 13/0022 348/48 |
| 2015/0146014 A1* | 5/2015 | Black ...................... G06T 5/008 348/187 |
| 2016/0035075 A1 | 2/2016 | Yamamoto |
| 2017/0094169 A1* | 3/2017 | Yoshikawa ........ H04N 5/23238 |

* cited by examiner

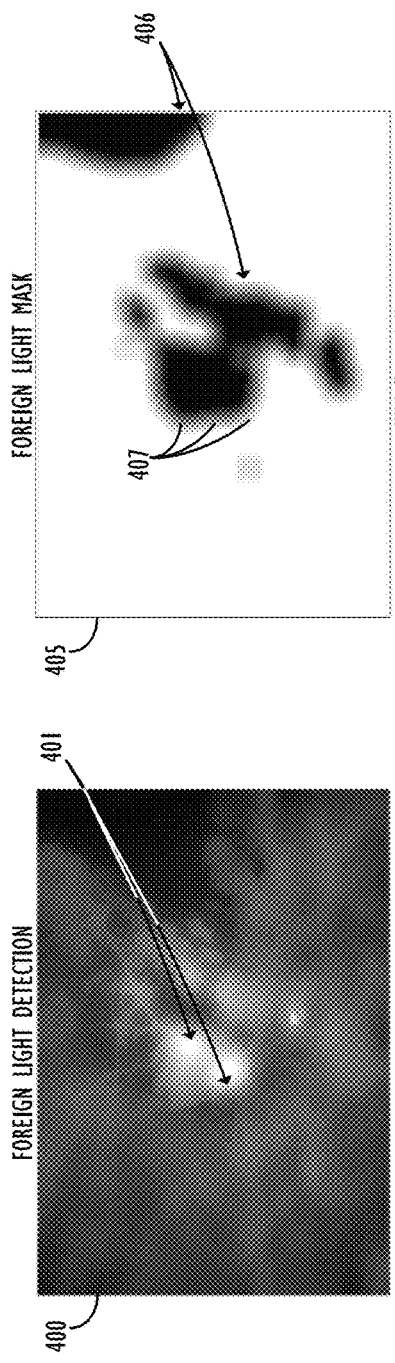
FIG. 4A
FIG. 4B
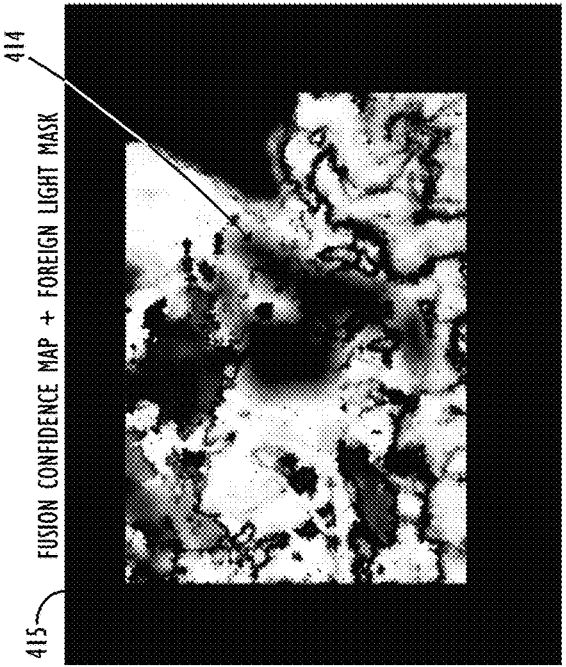
FIG. 4C
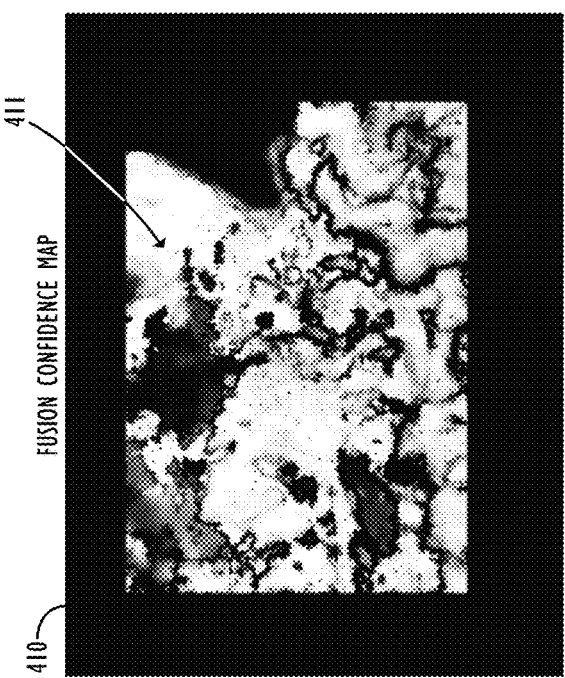
FIG. 4D

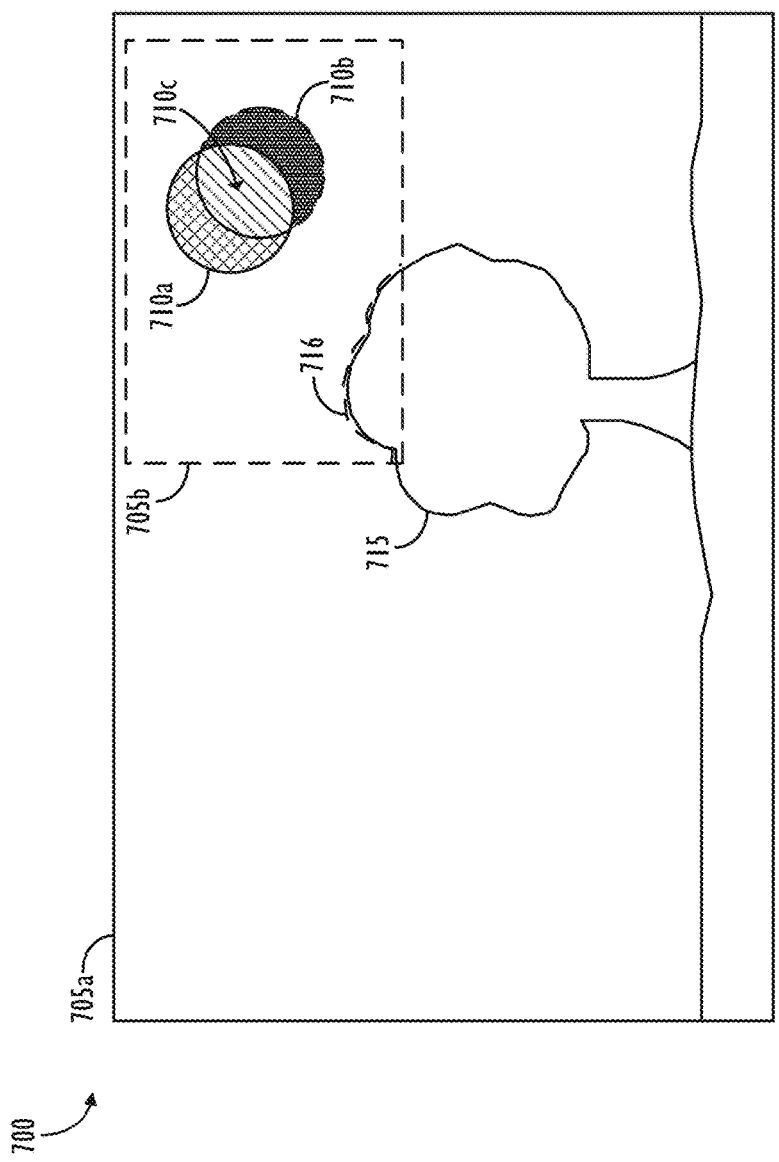

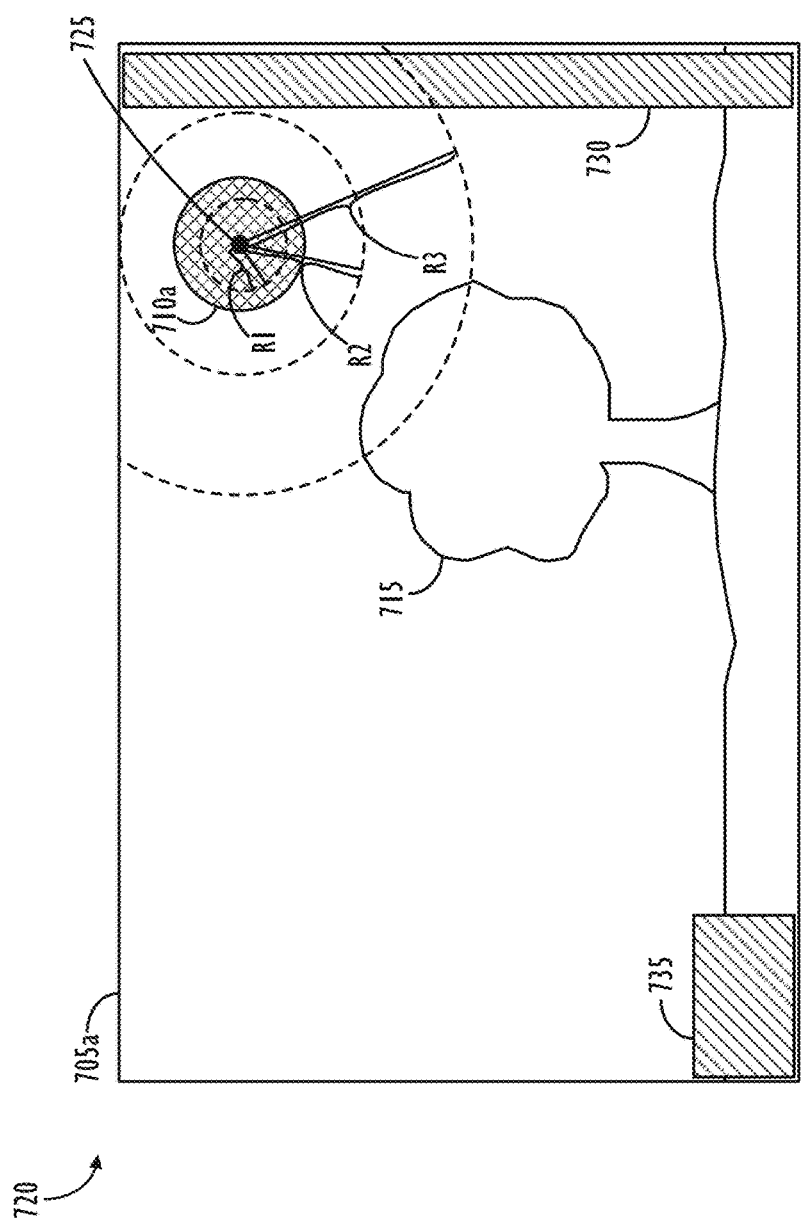

MISMATCHED FOREIGN LIGHT DETECTION AND MITIGATION IN THE IMAGE FUSION OF A TWO-CAMERA SYSTEM

TECHNICAL FIELD

This disclosure relates generally to the field of digital imaging. More particularly, but not by way of limitation, it relates to techniques for detecting and mitigating mismatched lens flare and other foreign lighting effects in fused images.

BACKGROUND

Lens flare is the light scattered in lens systems through internal reflections in the lens. Flare may be caused by a very bright light source (e.g., the Sun or a spotlight) that is either in the image or shining at the lens from a particular angle. The appearance of flare in natural images is determined by the shape of the camera aperture and the position of the bright light source, and it is often expected to have an almost regular shape, e.g., rings, circles, straight lines across the image, etc., although, in certain circumstances, a flare may be spread across a portion of an image (such as haze, which may affect large image regions with slowly varying strengths).

Taking high quality photographs in low ambient light conditions, or photographing dynamic scenes (e.g., sport scenes) may be challenging, e.g., due to camera motion and/or the motion of objects within a scene during image capture. One way to reduce motion blur without amplifying an image's noise is to capture and fuse multiple short-exposed images of the scene. Such operations are often called "Still Image Stabilization" (SIS). While shortening image exposure times can reduce motion blur artifacts, it may do so at the expense of a noisier and/or darker image.

One common approach to image fusion consists of: (1) selecting a "reference image" from a set of captured images; (2) globally registering each of one or more "non-reference" images with respect to the reference image; and (3) synthesizing an output image by fusing the non-reference images to the reference image. In this way, the output image represents the scene as it was at the time the reference image was captured, while the one or more non-reference images improve or otherwise alter the reference image. As an example, image fusion may be used to reduce the noise in the reference image, e.g., by averaging/merging multiple observations of each reference pixel across all images, or may be used to enhance details found in the reference image.

One common approach to synthesizing an output image by fusing all registered non-reference images to the reference image is to directly average corresponding pixels from across the images. Direct averaging may reduce the noise in the stationary areas of the image, but it may also introduce ghosting artifacts. Ghosting artifacts can occur when some of the pixels in the reference image are occluded in some of the non-reference images, e.g., due to moving objects in the scene. When there is motion between the captured images, significant ghosting artifacts may be present in the final output when the images are directly averaged.

In addition to differences between the reference and non-reference images caused by motion, there may also be differences caused by foreign light that is present in one or more of the images, but not present in the other images. One common source of foreign light in an image is so-called lens flare, referred to above.

The advent of small, mobile, multipurpose devices such as smartphones and tablet devices has resulted in a need for high-resolution, small form factor cameras, capable of generating high levels of image quality, for integration in the mobile devices. Increasingly, as users rely on these multifunction devices as their primary cameras for day-to-day use, users demand features, e.g., zoom photography, which they have become accustomed to using in dedicated-purpose camera bodies. The zoom function may be useful for capturing the details of a scene or alternatively capturing the context in which those details exist. The ability to change focal length to achieve zoom effects is sufficiently compelling to users of dedicated purpose cameras that it compels them to carry bags with an array of removable lenses, each of which may weigh more and takes up more space than many common examples of a multifunction device, such as a mobile phone.

Providing the zoom feature in a camera unit of a multifunction device has traditionally required moving mechanical parts that increase complexity and cost of the device. Such moving parts may also reduce reliability of the device and take up valuable space inside the device, which puts the desire for zoom functions in direct conflict with the desire for smaller camera units that take up less space in the multifunction device.

Thus, in some imaging devices, e.g., those described herein, there may be two (or more) optical sensors/camera units, e.g., which are configured to capture images of a scene, but which may have different specifications or operating parameters, such as a focal length, zoom, field of view, exposure settings, etc. As mentioned above, fused images may be created by blending together images or portions of images of a plurality of images captured by an imaging device having multiple optical sensors/camera units. Foreign light effects, e.g., in the form of lens flare patterns found in images captured by the various camera units of a multi-camera unit image capture device may be different in each of the captured images, due to, e.g., difference in lens design, sensor, position, and/or the angle between the optical axes of the multiple cameras and the bright light source(s) that caused the lens flare to occur in one (or more) of the captured images. Consequently, a set of images captured for image fusion purpose may be affected by flare in different ways depending on the mismatch of the flare patterns in each image. Fusing such images together may result in artifacts like unnatural jaggy flare borders, loss of image detail, hazy patches, unnatural looking flare borders, non-photorealistic flare composition, and/or skewed image coloration.

SUMMARY

Foreign light effects, such as lens flare, e.g., in the form of haze, bars, rings, and/or rays, is very common in natural images. In a multi-camera image capture device, e.g., a two-camera-system, the two images may be fused together to generate one image of a better quality. However, there are frequently mismatched foreign light effects in the two images that form the image pair, e.g., due to the difference in lens design, sensor and position, etc. Directly fusing such pairs of images may result in non-photorealistic images, with composed foreign light patterns from both images from the image pair. This disclosure describes a general foreign light (e.g., flare) mismatch detection scheme to detect all kinds of mismatched foreign light regions in a uniform way. Then, the detected mismatched foreign light regions may be mitigated (or omitted altogether) in the fusion step, in order to create a fused image that keeps a natural-looking foreign light pattern that is close to what was seen by the user of an image capture device, e.g., during an image capture preview mode.

A non-transitory program storage device is disclosed. The program storage device is readable by a programmable control device. Instructions are stored on the program storage device for causing the programmable control device to obtain a reference image and a non-reference image from an imaging system, wherein the reference image and non-reference image share an overlap region; determine a mask region within the overlap region, wherein the mask region comprises a region wherein a mismatched foreign light effect has been detected between the reference image and the non-reference image; and fuse the reference image and the non-reference image according to the determined mask region.

Other embodiments of non-transitory program storage devices are also disclosed. In one such embodiment, the reference image is captured by a first camera unit having a first field of view, and the non-reference image is captured by a second camera unit having a second field of view. In another embodiment, the reference image and non-references image may be parameter mapped globally before being registered to determine if there is strong global mismatch between the images (potentially indicative of haze in one or more of the images), in which case the image fusion process may be skipped. In another embodiment, the reference and non-reference images may be registered and parameter mapped, wherein the value of the parameter for a particular pixel indicates a likelihood that the particular pixel represents a mismatched foreign light effect between the reference image and the non-reference image at the location of the particular pixel.

In some embodiments, the mask region may further comprise a region wherein a foreign light effect has been detected in the non-reference image and not detected in the corresponding region(s) of the reference image (or vice versa). In other embodiments, the programmable control device may be further programmed to blend the reference image and non-reference image(s) in regions wherein a foreign light effect has been detected each of the reference image and the non-reference image(s) and/or exclude such regions from the mask region.

In another embodiment, the mask region is only determined after an image-level foreign light presence determination has been made. In other embodiments, the mask region may have comprise an isocontour region. In other embodiments, the mask region may possess a "feathered" or blurred edge. In other embodiments, values within the mask region may be modulated according to a determined foreign light probability value for the respective position in the image. In still other embodiments, the reference image and the non-reference image may be fused according to a fusion confidence map, wherein the fusion confidence map comprises a confidence value for each pixel in the non-reference image, the confidence value indicating a confidence with which the respective pixel should be fused with the corresponding pixel in the reference image.

Various methods of mitigating foreign light mismatch in a plurality of images are also disclosed herein, in accordance with the program storage device embodiments enumerated above. Various electronic image capture devices are also disclosed herein, in accordance with the program storage device embodiments enumerated above. Such electronic devices may include two or more optical sensors/camera units; a programmable control device; and a memory coupled to the programmable control device. Instructions are stored in the memory, the instructions causing the programmable control device to capture a plurality of images using the two or more image sensors; mitigate foreign light mismatch in one or more regions of a reference image containing foreign lighting; and generate a fused image from the plurality of captured images.

BRIEF DESCRIPTION OF THE DRAWINGS

FIGS. 4A-4D are image maps illustrating foreign light mismatch mitigation steps, according to one or more embodiments.

FIG. 7A is an image illustrating foreign light mismatch in a plurality of images, according to one or more embodiments.

FIG. 7B is an image illustrating foreign light probability within a particular region(s) of an image, according to one or more embodiments.

DETAILED DESCRIPTION

Figure 1:
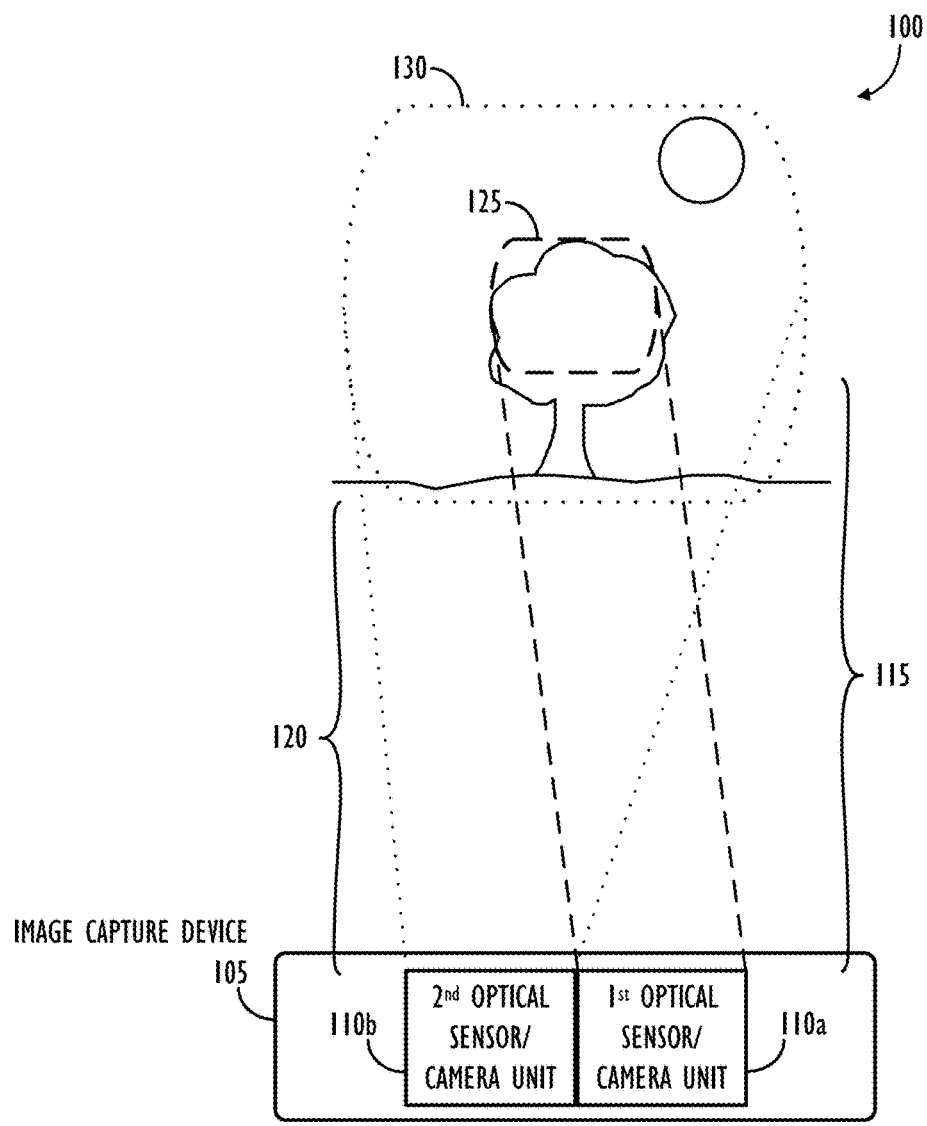
FIG. 1 is a view of an exemplary embodiment of camera module components arranged for multiple visual fields usable for a multiple camera unit system, according to one or more embodiments.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

While the image fusion techniques discussed herein may be applied to any two images captured by one or more image capture devices at any point or points in time, the image fusion techniques may have particular utility in instances where a multi-camera system captures a scene with multiple cameras. In these instances, it may be desirable to reduce the separation between image capture times of different cameras in the multi-camera system (e.g., to capture the images at a specific moment in time), since larger separations between image captures may increase the likelihood that scene movement may negatively impact the outcome of the fusion techniques described herein. Accordingly, in some instances, the various cameras of a multi-camera imaging system may be synchronized, such that images from different cameras are captured simultaneously. In other instances, the synchronization may be such that the image capture time from a first camera at least partially overlaps the image capture time from a second camera of the multi-camera system. In still other instances, the synchronization may be such that the time between the end of an image capture time of a first camera and the beginning of an image capture time of a second threshold is less than a threshold amount. The threshold amount may be selected based in part on an amount of motion between images that the system may be willing to tolerate in providing a fused image. It should be appreciated that capturing an image may also include capturing a plurality of exposures, some of which may be combined or otherwise modified to provide the captured image. Similarly, it should be appreciated that a captured image may be processed in some form, e.g., translated, scaled, rotated, warped, perspective corrected, etc., before— or as part of—the image fusion techniques described here.

Foreign light detection techniques determine which pixels in images of a plurality of captured images are likely to be pixels affected by foreign lighting artifacts, e.g., lens flare. Once the foreign light areas of the images are determined, unwanted foreign light effects in one or more of the captured images may be mitigated by various approaches, including the creation of foreign light mask regions, fusion confidence maps, and deemphasizing or discarding (i.e., not fusing the reference image with) entire regions of non-reference images that contain foreign light mismatch with the reference image.

Multi-Camera Systems and Image Fusion

Turning now to FIG. 1, a view 100 of an exemplary embodiment of camera module components arranged for multiple visual fields usable for a multiple camera unit system is shown, according to one or more embodiments. A portable multifunction image capture device 105 may include an imaging system, comprising: a first optical sensor/camera unit 110a with a first focal length 115 for capturing a first visual field 125 and a second optical sensor/camera unit 110b with a second focal length 120 for capturing a second visual field 130.

Some embodiments include a first camera unit 110a of a multifunction device for capturing a first image of a first visual field 125. A second camera unit 110b of the multifunction image capture device 105 may capture a second image of a second visual field 130 within a desired time frame, as discussed above. In some embodiments, the first camera unit 110a includes a first optical package with a first focal length 115. In some embodiments, the second camera unit 110b includes a second optical package with a second focal length 120. In some embodiments, the first focal length 115 is different from the second focal length 120, although, in other embodiments, the first focal length 115 may be the same as the second focal length 120. Typically, the multi-camera system is configured to capture the same scene with at least two cameras. Accordingly, in some variations, the first visual field 125 at least partially overlaps the second visual field 130. In some of these variations, the first visual field 125 is a subset of the second visual field 130. In some embodiments, the first image and the second image are preserved to a storage medium as separate data structures.

Some embodiments assign metadata to the first image of the first visual field 125 and the second image of the second visual field 130 that comprises a time indexing feature for establishing that the first image of the first visual field 125 and the second image of the second visual field 130 correspond as having been captured within a desired time frame, as discussed above. Some embodiments display the first image of the first visual field 125 in a screen interface with a control for switching to display of the second image of the second visual field 130, and, responsive to an actuation of the control, display the second image of the second visual field 130 in place of the first image. Some embodiments generate a fused image at least in part from data of the first image of the first visual field 125 and data of the second image of the second visual field 130. In some embodiments, the fused image has a third focal length different from each of the first focal length 115 and the second focal length 120, and the fused image has a third visual field different from each of the first visual field 125 and the second visual field 130. Some embodiments preserve storage of the first image of the first visual field 125 and data of the second image of the second visual field 130 after creation of the fused image.

Some embodiments generate a fused image based, at least in part, on data of the first image of the first visual field 125 and data of the second image of the second visual field 130. In some embodiments, the fused image is generated by enhancing the first image of the first visual field 125 using data from the second image of the second visual field 130. Some embodiments may display the first image of the first visual field 125 and the second image of the second visual field 130 in a shared screen interface.

Some embodiments include a camera system of a multifunction image capture device. In some embodiments, the camera system includes a first camera unit 110a of a multifunction device 105 for capturing a first image of a first visual field 125 and a second camera unit 110b of the multifunction device 105 for capturing a second image of a second visual field 130. In some embodiments, the first camera unit 110a includes a first optical package configured for a first focal length 115. In some embodiments, the second camera unit 110b includes a second optical package configured for a second focal length 120. In some embodiments, the first focal length 115 is different from the second focal length 120, although, in other embodiments, the first focal length 115 may be the same as the second focal length 120.

In some embodiments, the camera system includes a processing unit configured to assign to the first image of a first visual field 125 and the second image of a second visual field 130 a time indexing feature for establishing that the first image and the second image were captured within a threshold time of each other. In some embodiments, the first camera unit 110a includes a lens having a folded lens configuration (not shown) with a longer focal length 115 than a focal length 120 of a lens of the second camera unit 110b, and the second visual field 130 is centered on a second visual axis aligned with a first visual axis on which the first visual field 125 is centered. In some embodiments, the first camera unit 110a includes a first moveable lens and a first image sensor attached to a chassis of the first camera unit 110a, and the second camera unit includes a lens and a second image sensor moveably attached a chassis of the second camera unit 110b.

In some embodiments, the first camera unit 110a includes a first moveable lens and a first image sensor attached to a chassis of the first camera unit, and the second camera unit 110b includes a lens and a second image sensor moveably attached a chassis of the second camera unit. In some embodiments, the first camera unit 110a and the second camera unit 110b include a first image processing pipeline and a second image processing pipeline, respectively.

In some embodiments, the first camera unit 110a includes a first fixed lens and a first image sensor moveably attached a chassis of the first camera unit 110a, and the second camera unit 110b includes a second fixed lens and a second image sensor moveably attached a chassis of the second camera unit 110b. In some embodiments, the second camera unit 110b includes a second fixed lens aligned to share use of the first image sensor moveably attached the chassis of the second camera unit 110b.

In some embodiments, the first image and second image are of different media types. For example, in some embodiments, the first image is a moving image data structure captured at a first frame rate. In some embodiments, the second image is a moving image data structure captured at a second frame rate. In some embodiments, the second frame rate is faster than the first frame rate. In some embodiments, the first image is a still image taken at a point in time, t(0), and the second image is a moving image data structure captured over a time interval that includes time t(0).

In some embodiments, the first image has a first resolution, and the second image has a second resolution. An example of the use of a first image that is a moving image data structure at a first frame rate and a second image that is a moving image data structure at a second frame rate arises in that some embodiments include second camera module 110b recording 720 p (also known as 720 pixels of vertical resolution progressive scan) slow motion video at 240 frames per second while, first camera module 110a is capturing 4K (horizontal resolution on the order of 4,000 pixels) video at 30 frames per second. In some embodiments, the analog-to-digital converter bandwidth required for each separate module to achieve the recording is 220-270 Megapixels per second. Achieving the same functionality with conventional single camera module technology requires up to 32 times higher analog-to-digital converter bandwidth (i.e., when compared to embodiments in which there is a 2× difference in focal length between camera modules). Thus, the embodiments described above and illustrated in FIG. 1 may provide various benefits in terms of power, thermal dissipation, storage bandwidth, storage capacity, and actual achievable frame rates combined with zoom capability and intelligent (e.g., foreign light mismatch-aware) image fusion.

Exemplary Images with Foreign Light Regions

Figure 2A:
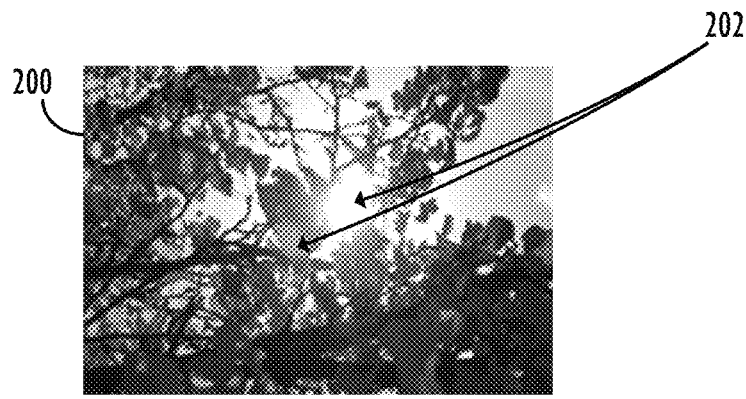
FIGS. 2A-2C are images illustrating foreign light detection, according to one or more embodiments.
Figure 2B:
Figure 2C:
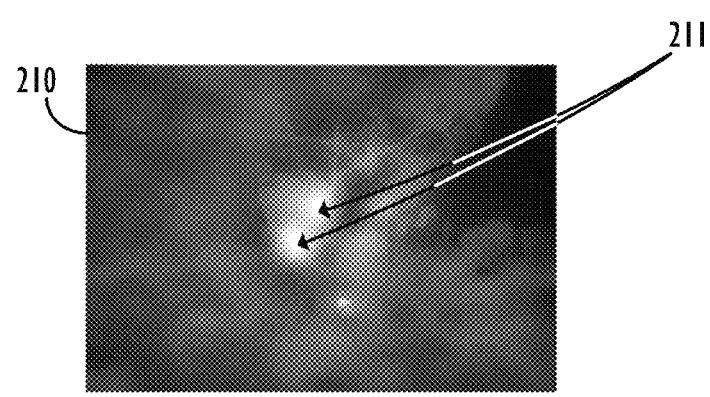

Referring now to FIGS. 2A-2C, images illustrating foreign light (e.g., in the form of lens flare) detection are shown, according to one or more embodiments. In this example, image 200 of FIG. 2A represents an image captured by a first optical sensor/camera unit having a first visual field, and image 205 of FIG. 2B represents an image captured by a second optical sensor/camera unit having a second visual field. In some embodiments, the second visual field may be larger than the first visual field. In such cases, the difference between the first visual field and the second visual field may comprise an unused peripheral region around the smaller image that may be excluded from the foreign light detection process between the images. In still other embodiments, the first visual field may be the same size as the second visual field, but the visual fields may only partially overlap one another. In such cases, the foreign light mismatch detection and mitigation processes described herein may be carried out in only the overlapping areas of the first and second visual fields. In this example, image 200 of FIG. 2A contains several foreign light regions 202, which appear as brightly-colored spots of lens flare in the image, emanating from the center of the image where the Sun is located in the image. Noticeably, image 205 of FIG. 2B appears to have corresponding foreign light regions 206 in corresponding locations in the image, but with different sizes, shapes, and color makeup.

If image 200 were the reference image and it was composited, i.e., fused, together with image 205 (serving as a non-reference image) without taking into account the mismatched foreign light regions between image 200 and image 205, the resultant fused image would potentially contain miscolored and/or misshapen foreign light regions where the color values of the pixels in the foreign light region of image 205 influenced the resultant fused image.

In some embodiments, only the reference image will be displayed to a user of the image capture device in a real-time image preview feed. In such cases, when the user captures an image with the image capture device, he or she will expect to see a foreign light pattern, e.g., in the form of a lens flare, consistent with what was shown in the reference image itself. In other words, if there was no foreign light in the reference image that was being previewed to the user when he or she indicated the moment of image capture, then he or she would not want or expect there to be any indication of foreign light in the resultant fused image. On the other hand, if there were foreign light region(s) in the reference image that was being previewed to the user when he or she indicated the moment of image capture, then he or she would likely want or expect the resultant fused image to maintain a foreign light region(s) consistent with what was being previewed to the user when he or she indicated the moment of image capture.

In this example, image 210 of FIG. 2C represents a parameter field to map the colors from the corresponding pixels of image 200 of FIG. 2A and image 205 of FIG. 2B. (In most embodiments, the images will be registered before the color mapping process is applied, so that the appropriate pixels in the reference image may be mapped to the respective corresponding pixels in the other non-reference image(s)). In the parameter field image 210, the brighter a pixel is, the more mapping that is needed between the corresponding pixel values in image 200 and image 205. In other words, the bright white pixels in image 210 represent the greatest areas of mismatch between image 200 and image 205. Not surprisingly, there are regions of bright white pixels in image 210 that correspond to the location of the foreign light regions 202 in image 200 of FIG. 2A that are present, but only to a lesser extent, in image 205 of FIG. 2B. In some embodiments, a single image parameter, e.g., luminance, may be mapped between the corresponding pixels of the reference image and the non-reference image(s). In other embodiments, multiple image parameter fields may be created, e.g., R, G, B, to match the colors between the corresponding pixels of the reference image and the non-reference image(s).

In some embodiments, the parameter matching function may comprise a single-parameter function, e.g., $y=f_a(x)$, wherein x equals the value of the parameter of interest (e.g., luminance) in a pixel in the non-reference image, y equals the target value of the parameter of interest in the corresponding pixel in the reference image, and $f_a$ represents the parameter field matching function that maps the value of x in the non-reference image to the value of y in the reference image, and which may, e.g., comprise a function such as: $y=ax^2+bx$ (wherein a constraint is applied that: $a+b=1$), which reduces to: $y=ax^2+(1-a)x=ax^2-ax+x$. Thus, it may be seen that when the value of parameter $a=0$, then $y=x$, in other words, the two images have matching pixel values, whereas, when the value of parameter $a=1$, then $y=x^2$, in other words, the value of the pixel in the non-reference image is equal to the square of the value of the corresponding pixel in the reference image.

In general, no matter what parameterizing function is used in a given implementation, the parameter 'a' will have a small value when the two images have similar corresponding pixel values, and the parameter 'a' will have a larger value the more that the corresponding pixels between the images differ from one another. Thus, as mentioned above, the regions of bright white pixels in image 210 (i.e., large values of the parameter 'a') correspond to the locations where image 200 of FIG. 2A and image 205 of FIG. 2B are the most different from each other, i.e., in the foreign light regions 202 of image 200. If each pixel in the non-reference image is mapped exactly onto the reference image using the parameter matching function, however, the mapped non-reference image will essentially be identical to the reference image, meaning that there would be no real advantage to be gained from the fusion of the two images. Thus, in some embodiments, certain smoothness constraints may be placed upon the parameter filed, such that that the parameter field is of a much lower frequency than the image content itself. Because it would take a very aggressive mapping to match the corresponding image regions of the non-reference image and reference image in regions of mismatched foreign light, the value of the parameter in the region indicates the likelihood that a mismatched foreign light is present in the image region. In other words, the smoothness constraints placed upon the parameter field may be used in order to: 1.) preserve image details in the non-reference image; and 2.) ensure that there are no abrupt transitions in the color-mapped image. Of course, as will be explained herein, not all differences in luminance and/or color between corresponding pixels in the reference and non-reference image(s) may be attributable to the presence of foreign light (e.g., lens flare) in one of the images. Other causes, such as image registration errors, occlusions, and/or differences in the alignment of edges/features between the reference and non-reference image(s) may also cause large parameter values in the corresponding pixel locations in the parameter field, yet are not indicative of foreign light regions in either of the images. Such non-foreign light related differences between the images being fused may be accounted for according to various techniques described herein.

In some embodiments, a foreign light detection process, e.g., in accordance with that described in reference to FIGS. 3A-3D and FIG. 5B herein, may be performed to determine which pixels in the respective regions are likely to be a part of a foreign light region in the image. In some embodiments, a single, image-level determination may be made as to whether or not the image possesses any foreign light regions. For example, if the number of likely foreign light pixels/regions identified in the image is above some threshold minimum number (and, optionally, below some threshold maximum number), then the image may be adjudged to possess at least one foreign light region, and thus passed on for foreign light mitigation processing, if so desired.

Because of the potentially computationally expensive nature of foreign light mitigation, certain embodiments may use the foreign light detection processes described herein as (e.g., simply thresholding the parameter field map on some value, $a_{thresh}$) as a 'gate keeper' process to prevent expensive foreign light mitigation processing from being carried out on image pairs that are not indicative of the presence of foreign light regions after the foreign light detection processing steps have been carried out on the images. In other words, if enough pixels in the parameter field map to not exceed $a_{thresh}$, then the image may simply be considered to not have any foreign light regions and the foreign light mitigation processing steps may be omitted. This 'gate keeper' process may also be used to help excluded certain cases of images from being misdiagnosed as containing foreign light (i.e., limiting the number of false-positive foreign light detected images). For example, in the case when the automatic white balancing (AWB) operation of one camera has a different offset than that of the other camera, the resulting parameter field may contain many large values that are not necessarily indicative of foreign light, but instead are indicative of the differences in pixel values caused by the AWB system of one or both of the cameras used to capture the images. One way to distinguish these situations is that foreign light, e.g., in the form of lens flare, typically has a regional impact in images, and other forms of luma/color mismatch (such as may be caused by an AWB system) is typically a global phenomenon affecting the entire image. In the global mismatch case, color matching is usually capable of correcting the non-reference image and still safely perform fusion with the reference image after it has been corrected. In such situations, a histogram matching step (which will be described in further detail herein) may be used to largely exclude the impact of global luma/color mismatch between the images prior to performing the foreign light detection. Further, as mentioned above, in some embodiments, if more than a threshold maximum number of pixels in the parameter field map exceed $a_{thresh}$, it may also be an indication that the image does not actually possess foreign light regions, but instead that the parameter has been set wrong for the image. Such images may thus be declared not to possess foreign light regions, unless and until the parameter is recalibrated for the images and the parameter field map may be reassessed.

Figure 3A:
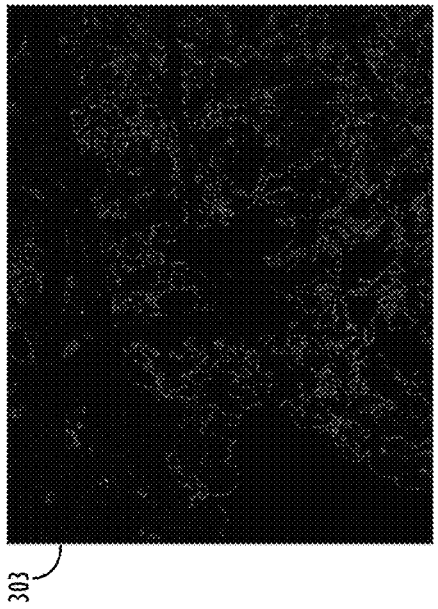
FIGS. 3A-3D are image maps illustrating foreign light detection steps, according to one or more embodiments.

Referring now to FIGS. 3A-3D, image maps illustrating foreign light detection steps are shown, according to one or more embodiments. First, image map 300 of FIG. 3A illustrates the result of a histogram matching and absolute difference operation being performed upon the reference and non-reference image(s). In particular, the histogram matching operation between the reference image and non-reference image(s) may be performed on a single channel, e.g., the luminance channel, or may be performed on multiple individual color channels (e.g., R, G, B). "Histogram matching" is a global image processing operation that may be used to bring one image into a similar brightness/contrast range of another image. For example, in the case of foreign light mismatch detection, the non-reference image may be mapped to the reference image via histogram matching techniques. According to some embodiments, the histogram matching algorithm may operate by creating a look up table (LUT) using the image statistics, and then map each of the pixels in the non-reference image to the reference image, according to the look up table. As a result of this operation, the histogram of the "histogram matched non-reference image" will be very similar to the histogram of the reference image. Next, an absolute difference operation may be performed between the corresponding pixels of the reference image and histogram matched non-reference image in order to visualize how different the images are. As may now be understood, if one of the images has a particular sub-region exhibiting a foreign light effect, e.g., lens flare, such sub-region will not be mapped to a similar brightness/contrast in the corresponding region in the other image after this histogram matching, since histogram matching is a global operation, and does not adapt well to local content changes (e.g., localized flare or other foreign light effect). Sometimes, the foreign light regions in the resulting absolute difference image map can be buried within a lot of noise caused by minor differences in the edges in the images after image registration. In other words, the chances of having the edges perfectly matched after image registration is very low. Thus, the bright white pixels regions in image map 300 represent regions of greatest difference between corresponding pixels in the reference image and the non-reference image. As mentioned above, some of the white regions in image map 300 may represent actual differences cause by foreign light mismatch between the images, but other of the white regions in image map 300 may be 'false positives' in the search for foreign light mismatch, and instead represent differences between the images caused by image registration mismatch that is not indicative of foreign light.

Figure 3B:
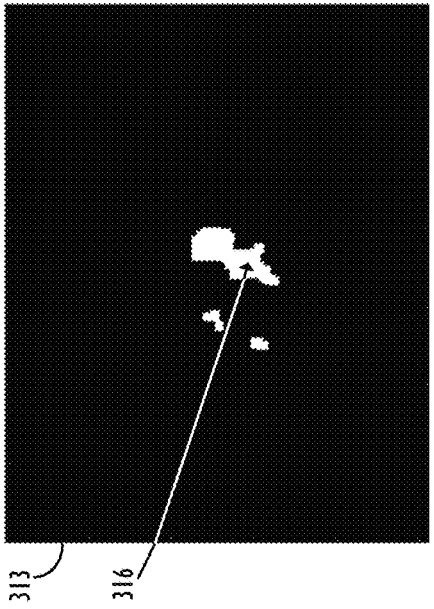
Figure 3C:

Turning now to image map 305 of FIG. 3B, a gradient magnitude map is shown. In particular, gradient magnitude image map 305 represents the magnitude of the gradient calculated for each pixel in the reference image. Construction of a gradient magnitude map is a common operation that may be used to detect the location of edges, details, features, etc. (or any other non-diffuse pattern) occurring in the image. Since foreign light effects in images, e.g., in the form of lens flare, are typically diffuse phenomena, the gradient map may be useful to isolate those area in the image where the mismatch is due to edges in the reference image (but not foreign light). Then, as shown in image map 310 of FIG. 3C, by effectively dividing image map 300 of FIG. 3A by image map 305 of FIG. 3B, a diffuse mismatch map may be generated, which isolates from image map 300 of FIG. 3A only those differences between the reference and non-reference image which are not likely to be attributable to mismatched edges between the image. In other words, the bright white pixels in image map 310 of FIG. 3C are a good approximation of actual regions of foreign light mismatch between the reference image and the non-reference image (i.e., and suppress many of the 'false positive' mismatches likely to be caused by image registration differences between edges, details, features, etc. in the images). In some embodiments, the equation used to generate image map 310 of FIG. 3C may be: c=a/(b+E), wherein 'c' equals the value of the pixel in image map 310, 'a' equals the value of the pixel in image map 300, 'b' equals the value of the pixel in image map 305, and ε equals a small epsilon value to prevent 'divide-by-zero' errors in the calculation of the resultant value for the pixels in image map 310.

Figure 3D:
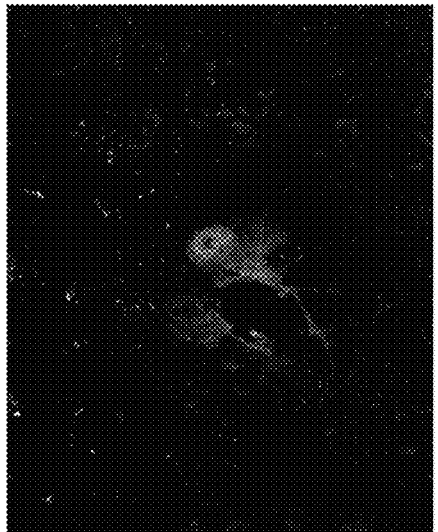

Finally, turning to image map 315 of FIG. 3D, a foreign light region is detected after thresholding and morphological operations have been applied to the diffuse mismatch map 310 of FIG. 3C. In particular, a thresholding operation may discard (i.e., set to 'black' or '0' value) those pixels that do not have greater than a threshold difference value in diffuse mismatch map 310 of FIG. 3C. Discarding pixels using this threshold may reflect the belief that the difference in values between the reference image and non-reference image for this pixel was still too likely to have been caused by image registration errors rather than foreign light mismatch. Once the pixels that have passed the thresholding operation are remaining in image map 315 of FIG. 3D, additional morphological operations may be applied, if so desired by a given implementation. For example, small 'clusters' or 'islands' of white pixels in the image map 315 may be set to 'black' or '0' values if they do not possess a threshold number of pixels. Discarding pixels using this threshold may reflect the belief that the small clusters of pixel mismatch between the reference image and the non-reference image are more likely to represent other anomalies or random noise in the image, rather than actual foreign light mismatch. The morphological operations may also including 'filling in' foreign light regions within image map 315, e.g., where a small cluster of black pixels in image map 315 are surrounded on all sides by pixels that have been declared foreign light pixels are themselves converted to foreign light pixels, thus creating 'foreign light islands' that do not have any discontinuities or 'holes' within them. If two foreign light islands are within a threshold distance of one another, certain morphological operations may also simply combine the two foreign light islands into a single, contiguous larger foreign light island that encompasses all the pixels of the original two smaller foreign light islands. The results of the thresholding and morphological operations for one exemplary image are shown in image map 315 of FIG. 3D. In particular, there are several discrete foreign light islands 316, indicated by the regions of white pixels, surrounded by black regions that indicate a lack of foreign light mismatch. If the overall size of the foreign light islands in image map 315 exceeds some threshold minimum value (and, optionally is lower than some threshold maximum value), then the images may be declared to have at least some foreign light mismatch present in the images, and further foreign light mitigation processing may be undertaken, if so desired by a given implementation.

Referring now to FIGS. 4A-4D, image maps illustrating foreign light mismatch mitigation steps are shown, according to one or more embodiments. Turning first to FIG. 4A, image 400 is a copy of the parameter field shown in image 210 of FIG. 2C. Recall that, in parameter field map 400, the brighter a pixel is, the more likely a given pixel is to be a part of a foreign light region. In other words, the bright white pixel regions, e.g., regions 401 in image 410 represent the greatest areas of mismatch (and, thus, foreign light likelihood) in the registered images 400 and image 405.

Turning now to FIG. 4B, a foreign light mask 405 is shown that has been created, at least in part, e.g., according to the techniques described above with reference to FIGS. 3A-3D. In particular, regions of mismatch in corresponding pixels between the reference and non-reference images may have been identified, and then those sub-regions of mismatch that were determined to be more likely to be due to image registration errors than actual diffuse foreign light patterns may have been removed. The remaining foreign light regions may have then been grown/shrunk using thresholding and/or morphological operations to result in the foreign light mask 405 shown in FIG. 4B. According to some embodiments, the thresholding operations performed on the foreign light mask may have the effect of creating so-called 'iso-contour' regions, wherein the pixels along the outer edge 407 of any given foreign light island 406 represent pixels having the same color matching parameter value (e.g., the 'a' value discussed above with reference to FIG. 2C). In still other embodiments, the edges of the foreign light islands 406 may be "feathered" or blurred, so that there is not as abrupt of a transition between the foreign light regions and the non-foreign light regions when the ultimate image fusion process is performed.

Turning now to FIG. 4C, a fusion confidence map 410 is shown that has been created based, at least in part, on the registration quality between the reference and non-reference images. In some embodiments, the fusion confidence map may be created during (or in conjunction with) the image registration process, so as to avoid the impact of occlusions and/or mis-registration between the images. As shown in fusion confidence map 410, the brighter white a pixel is in the fusion confidence map 410, the better the registration quality was for that pixel, and thus the higher the confidence is that the reference and non-reference images should be fused for those pixels. By contrast, the darker a pixel is in the fusion confidence map 410, the worse the registration quality was for that pixel, and thus the lower the confidence is that the reference and non-reference images should be fused for those pixels. In other words, the decision of whether or not to fuse the reference and non-reference images (or, in some embodiments, the degree to which the corresponding pixel from the non-reference image is given any influence on the resultant value of the pixel in the fused image) for a given pixel may be based on the magnitude of the corresponding value in the fusion confidence map 410.

Turning now to FIG. 4D, one final adjustment to the fusion confidence map 410 of FIG. 4C is shown, which allows the fusion process to take into account the foreign light mask that was created, e.g., as shown in image 405 of FIG. 4B). In particular, map 415 of FIG. 4D represents a combination of the fusion confidence map 410 of FIG. 4C and the foreign light mask 405 of FIG. 4B. As shown, dark regions 416 in the 'fusion confidence map modulated with foreign light mask' 415 of FIG. 4D correspond to the central foreign light island 406 in the foreign light mask 405 of FIG. 4B. The regions of black pixels in map 415 of FIG. 4D represent regions where the pixels of the non-reference image will not be fused to the pixels from the reference image. As may now be understood, regions where image fusion will be omitted, based on map 415 of FIG. 4D, now include both regions where the confidence that the images should be fused is low (e.g., due to poor quality image registration), as well as likely foreign light mismatch regions, where fusing together the images would produce hazy and/or miscolored regions in the image that did not match what the user of the image capture device was looking at on the image preview screen when he or she decided to capture the image. By contrast, regions of white pixels in map 415 of FIG. 4D represent regions where there is high confidence that fusing the pixels of the non-reference image with the corresponding pixels from the reference image will actually improve image quality, rather than create unwanted visual artifacts due to image registration errors and/or foreign light source (e.g., flare) mismatch between the reference image and non-reference image.

Overview

Figure 5A:
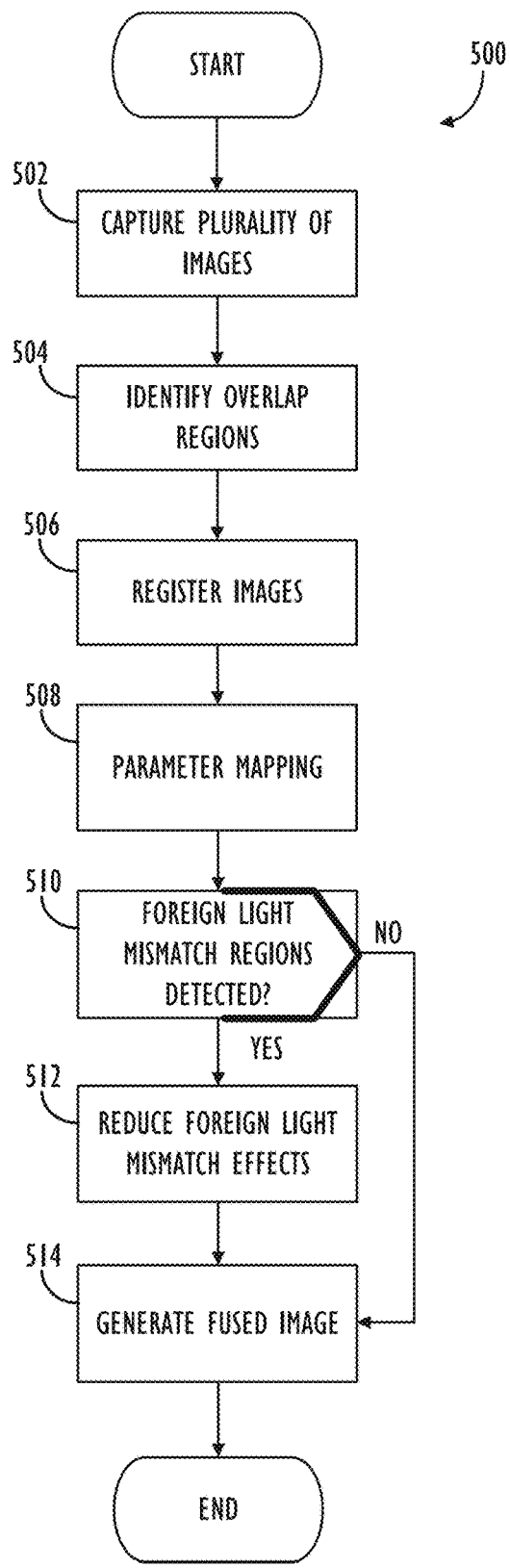
FIG. 5A is a flowchart illustrating a technique for mitigating the effects of foreign light mismatch in a plurality of images, according to one or more embodiments.

FIG. 5A is a flowchart illustrating an overview of a technique 500 for generating a fused image that reduces the effects of foreign light mismatch. In block 502, a plurality of images may be captured that are to be fused together to form a fused image. In block 504, overlap regions between captured images in the plurality of images may be detected. (In some cases, e.g., implementations wherein a wide-angle lens and a 'tele' lens are used by an image capture device with multiple camera units, the field of view of one captured image may fit entirely within the field of view of another captured image having a wider angle lens.) In block 506, various techniques for registering the plurality of images (e.g., techniques to register one non-reference image to a reference image) may be used as desired. In block 508, a parameterized function, e.g., a single-parameter function, may be used to map the values (e.g., luminance values and/or particular color channel values) of the non-reference image onto the reference image. In block 510, the presence of foreign light mismatch regions may be detected, and regions of the image containing foreign light may be determined. If foreign light mismatch regions are detected, the operation may proceed to block 512, where the effects of foreign light mismatch may be reduced or eliminated, e.g., via the use of a foreign light mask. If foreign light mismatch regions are not detected, the operation may proceed directly to block 514. Finally, in block 514, the fused image may be generated by fusing the images together, e.g., according to a combined fusion confidence map and foreign light mask (i.e., if foreign light mismatch regions were detected in the images). Various techniques for generating the fused image from the plurality of images are known (e.g., pixel averaging), and may be used as desired.

Detection of Foreign Light Mismatch in Images

Figure 5B:
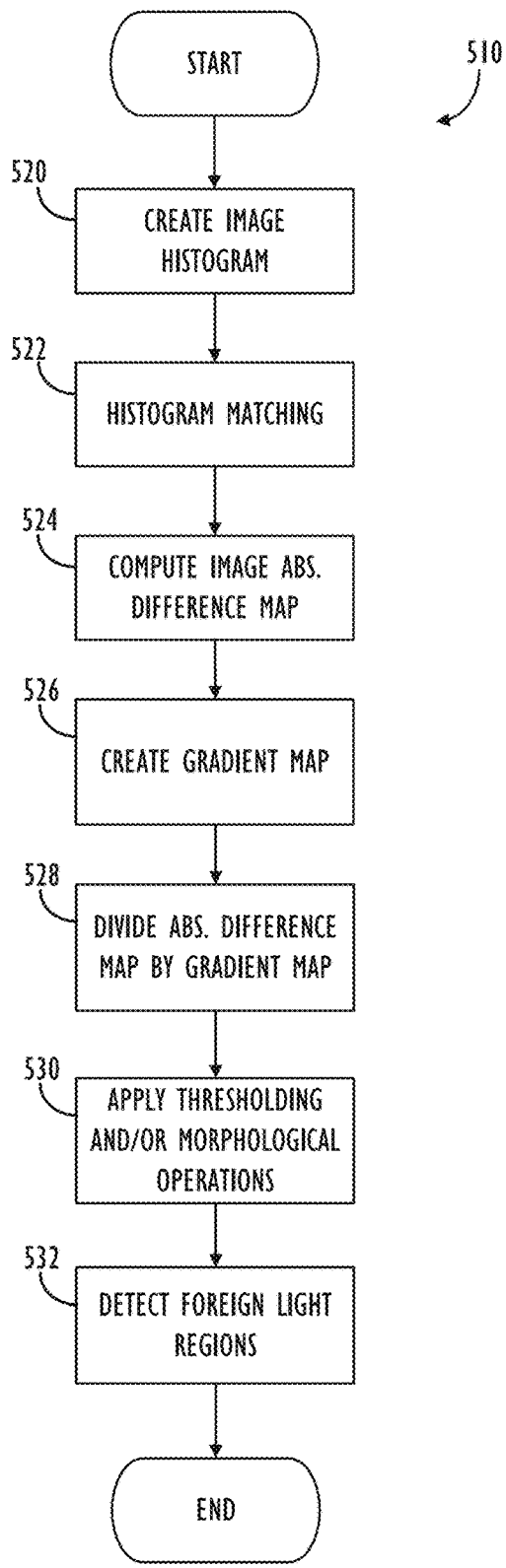
FIG. 5B is a flowchart illustrating a technique for detecting foreign light regions in an individual image, according to one or more embodiments.

FIG. 5B is a flowchart illustrating a technique 510 for detecting foreign light mismatch in a plurality of images, e.g., in a reference image and a non-reference image. (FIG. 5B provides additional details to the implementation of block 510 of FIG. 5A). A plurality of images taken by the same imaging device within a threshold time period of each other, e.g., with each of a plurality of different optical sensors/camera units, will typically exhibit similar luminance and/or color histograms with each other across the plurality of images (with potential differences in the histograms coming from, e.g., different lenses, sensor calibration/capabilities, different fields of view, and/or zoom levels, or even difference in image composition if the camera units are pointed at different scenes or different parts of the same scene). However, in an image with foreign light, e.g., lens flare, the lens flare typically causes a spike or difference in those histograms can be recognized. In block 520, the image histograms may be created, e.g., over the images' luminance channels and/or individual color or chroma channels. In block 522, the histograms for the various images may be matched with each other, e.g., by aligning the dynamic ranges of the images and/or mapping particular luminance/color bins from one optical sensor to another, e.g., based on the cumulative distribution function (CDF) of the captured images. In block 524, the absolute differences between the luminance/color values of corresponding pixels in the reference image and the histogram matched non-reference image may be calculated (see, e.g., image 300 of FIG. 3A). In block 526, a gradient magnitude map may be created over the reference image (see, e.g., image 305 of FIG. 3B). Next, in block 528, an image map may be created that is the result of dividing the result of block 524 by the result of block 526 (see, e.g., image 310 of FIG. 3C). Desired thresholding and/or morphological operations (block 530) may then be applied to the result of block 528 to create a foreign light region map (see, e.g., image 315 of FIG. 3D). Based on the presence (or absence) of a sufficient number of foreign light regions in the foreign light map, process 510 may return either a positive (or negative) indication of whether there is foreign light mismatch present in the images that are presently attempting to be fused (block 532).

Mitigation of Foreign Light Mismatch Between Images Used to Form a Fused Image

Figure 5C:
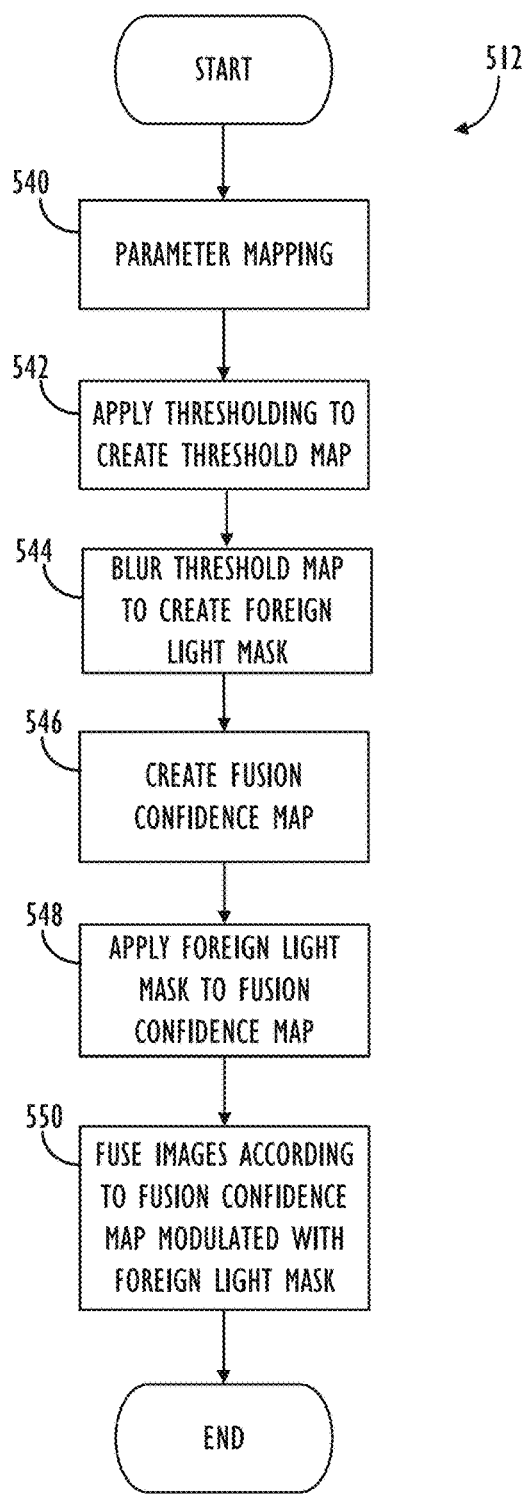
FIG. 5C is a flowchart illustrating a technique for mitigating the effects of foreign light mismatch in a plurality of images, according to one or more embodiments.

FIG. 5C is a flowchart illustrating a technique 512 for reducing, i.e., mitigating, foreign light mismatch in a plurality of images, e.g., in a reference image and a non-reference image. (FIG. 5C provides additional details to the implementation of block 512 of FIG. 5A). In block 540, the process may obtain the identified mismatch regions between the images, e.g., in the form of a parameter field map, such as described above with reference to image 400 of FIG. 4A. In some embodiments, the mismatched regions may be culled to only include mismatched regions likely to be caused by foreign light effects, such as flare (see, e.g., image 310 of FIG. 3C). Desired thresholding (block 542) and/or blurring operations (i.e., softening the edges of determined iso-contour foreign light islands) (block 544), may then be applied to create a final foreign light region mask (see, e.g., image 405 of FIG. 4B). In some embodiments, the foreign light mask may be created using only the luminance channel and/or a single color channel. In other embodiments, however, a foreign light mask may be created in each desired color channel (e.g., R, G, B), e.g., because a purple-colored flare would have a difference luminance profile than a white flare, and then combine each of the created foreign light masks for the different color channels into a single, aggregated foreign light mask. At block 546, a fusion confidence map may be created, as discussed above with reference to image 410 of FIG. 4C. At block 548, the foreign light map created at block 544 may be applied to the fusion confidence map created at block 546 to generate a combined fusion confidence/foreign light mask map that takes into account both potential image registration errors between the images and potential regions of foreign light mismatch. At block 550, the result of block 548 may be used to actually fuse the images according to any desired fusion technique(s). As mentioned above with reference to image 415 of FIG. 4D, the result of block 548 may be used to determine which pixels will be fused between the reference image and the non-reference image (and, optionally, if being fused, the extent to which the corresponding pixel from the non-reference image will be allowed to influence the final pixel value in the resultant fused image). In some embodiments, the fusion process may further comprise the use of one or more image pyramids operating on different resolution versions of the image and/or reference image. The particular fusion approach used may be left up to the design needs of a given implementation.

Figure 6:
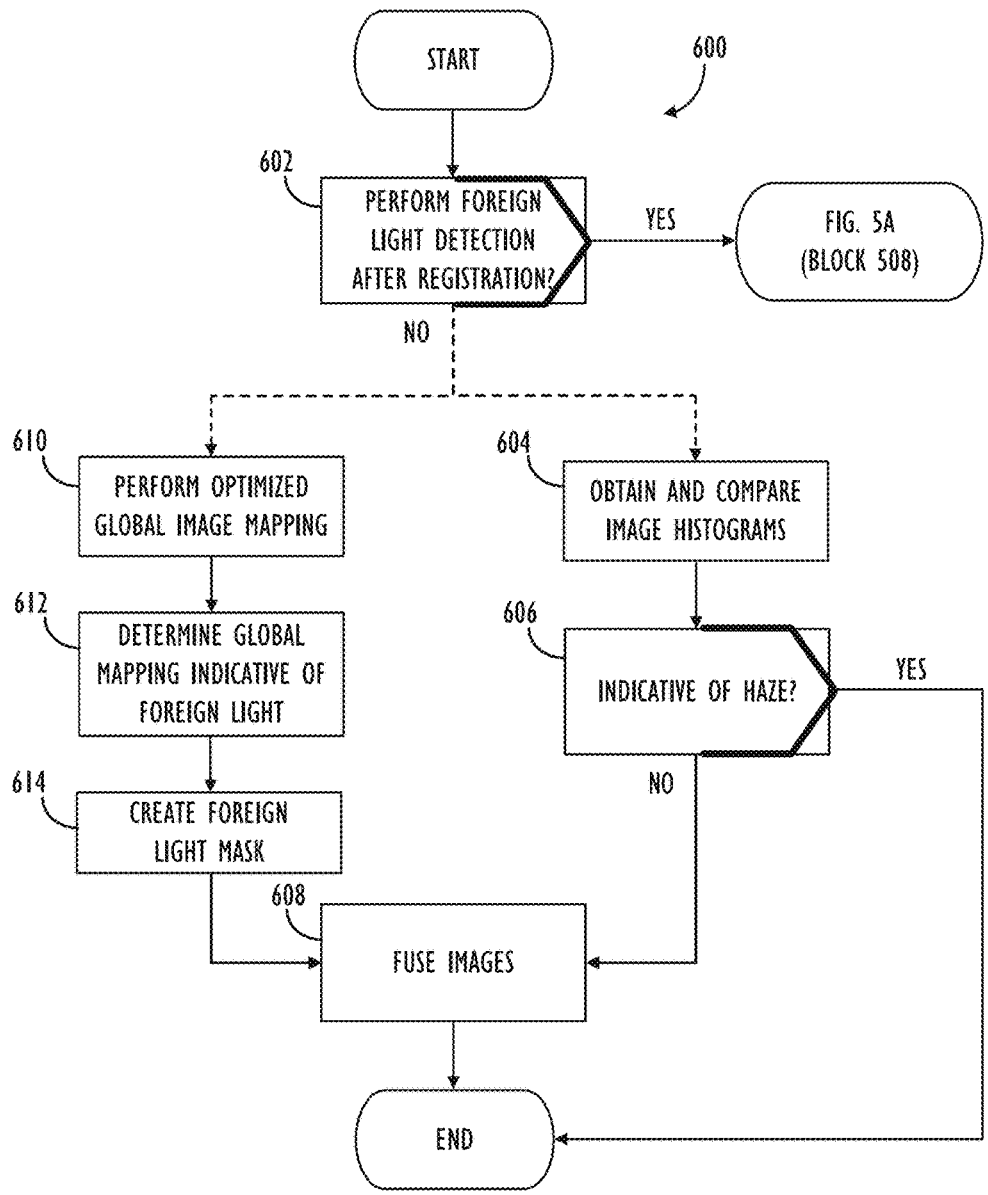
FIG. 6 is a flowchart illustrating local and global techniques for detecting foreign light regions in an individual image, according to one or more embodiments.

Turning now to FIG. 6, a flowchart 600 is shown, illustrating local and global techniques for detecting foreign light regions in an individual image, according to one or more embodiments. First, at block 602, if it is determined that foreign light detection should be done after the reference and non-reference image have been registered (i.e., "YES" at block 602), then then a 'local' foreign light detection process may take place, e.g., as is illustrated and described above with reference to FIG. 5A (starting at block 508). If, instead, it is determined that foreign light detection processing should be done before (or without) image registration (i.e., "NO" at block 602), then then a 'global' foreign light detection process may take place. For example, in one optional embodiment, the process may proceed towards block 604, wherein image histograms may be obtained for each desired input channel (e.g., luminance and/or color channels). At block 606, the image histograms may be analyzed to see if there is one or more peak shifts between the histograms, which may be indicative of a haze artifact in one or more of the images (i.e., a globally diffuse foreign light pattern). If the image histograms are indicative of a haze artifact (i.e., "YES" at block 606), the process may simply skip the fusion process and end, e.g., by simply outputting the reference image (since global haze mismatch is unlikely to be ameliorated by a localized foreign light detection and mitigation process). If, instead, the image histograms are not indicative of a haze artifact (i.e., "NO" at block 606), but instead indicative of some other kind of local foreign light artifact, the process may proceed to block 608 and fuse the reference and non-reference images, e.g., by using one or more of the fusion techniques described herein.

According to another optional embodiment, in response to a decision of "NO" at block 602, the process may instead proceed to block 610, wherein an optimized global matrix may be determined that attempts to map every input (e.g., non-reference image) channel luminance/color value to every output (e.g., reference image) channel luminance/color value with the least global mismatch possible. This matrix may be optimized globally for every pixel in the images. In one exemplary embodiment, the optimized global matrix may comprise a 3×3 matrix that globally maps the non-reference image to attempt to match the reference image. Then, at block 612, after applying the optimized global matrix, any number of techniques may be used to determine that the images are indicative of foreign light mismatch in one or more of the images (e.g., because there are regions of strong difference between the reference image and non-reference image). The process may then proceed to block 614 and create a foreign light mask (e.g., using a regional foreign light mask produced from the global mapping process). Finally, the process may proceed to block 608 and fuse the reference and non-reference images according to the created foreign light mask, e.g., by using one or more of the foreign light mask creation and fusion techniques described herein.

Turning now to FIG. 7A, an image 700 is shown, illustrating foreign light mismatch in a plurality of images, according to one or more embodiments. In this example, image 700 may be created by fusing a first image 705$a$ captured by a first optical sensor/camera unit having a wide field of view (FOV) lens and a second image 705$b$ (represented by the dashed line rectangle in the upper right hand corner of the image 700) captured by a second optical sensor/camera unit having a narrower field of view (e.g., potentially due to a different focal length and/or zoom level). In this example, image 700 comprises a tree object 715 that does not comprise any foreign light regions (but may, e.g., comprise some misaligned edges between first image 705$a$ and second image 705$b$, as represented by the dashed line edge 716 around the top of the tree captured by second image 705$b$), as well as a Sun object 710 that does comprise a foreign light region, e.g., in the form of a flare. As shown in FIG. 7A, the flare region coming from the Sun as captured in first image 705$a$ is represented by the combination of foreign light region 710$a$ and shared foreign light region 710$c$. Likewise, the foreign light region coming from the Sun as captured in second image 705$b$ is represented by the combination of foreign light region 710$b$ and shared foreign light region 710$c$. In other words, the foreign light mismatch in this example between first image 705$a$ and second image 705$b$ comprises both shared regions of foreign light and regions of foreign light that are present in only one image or the other.

According to some embodiments, the foreign light regions maintained in the final fused image will be whichever foreign light regions were present in the reference image, and foreign light regions present only in the non-reference image will be masked out from the fusion process. (This is because, in many instances, the reference image will be what the user was looking at on the image preview display at the moment he or she decided to capture the image, and, so, he or she would likely expect the foreign light pattern, e.g., in the form of a flare pattern, that ends up in the fused image to match what was showing at the moment of capture.) So, in this example, if first image 705a is designated as the reference image, then the pixels in region 710 in the resultant fused image will come exclusively from image 705a. In other words, regions 710a and 710c will be filled in with the foreign light (presumably bright white) pixels from image 705a, and the pixels in region 710b will be filled in with the non-foreign light (presumably blue, or whatever color the sky happens to be) pixels from image 705a. In some embodiments, where there is foreign light overlap between the reference and the non-reference image, e.g., like region 710c in FIG. 7A, the pixels in the foreign light overlap region of the resultant fused image may come solely from the reference image. However, in other embodiments, if so desired, the pixels in the foreign light overlap region of the resultant fused image may come from a blend or fusion of the pixel values in the overlapping foreign light regions of the reference image and the non-reference image.

In still other embodiments, if there is a foreign light region present in a first region of a first image that is not present in the corresponding region of a second image, the foreign light region could be removed from the image where the foreign light region is present, e.g., by filling in the 'foreign light-affected' pixels with the corresponding 'non-foreign light affected' pixels from the other image. In some embodiments, this 'foreign light removal' process could even be implemented in 'real-time,' i.e., so that the user never sees the foreign light artifacts on the preview screen (assuming there are corresponding non-foreign light affected pixels from another image to replace the foreign light affected pixels with).

In still other embodiments, an image capture device could even present a user with a user interface (UI) toggle switch, allowing the user to indicate whether he or she wanted to: 1.) keep foreign light as seen in image preview mode in the fused image (i.e., keep foreign light as seen in reference image only); 2.) remove all foreign light from the preview (and/or fused) image, if possible, i.e., if the other image has corresponding 'non-foreign light affected' pixels that the foreign light affected pixels may be replaced with; and/or 3.) blend foreign light regions in the preview (and/or fused) image, i.e., in overlapping foreign light regions between the reference image and non-reference image.

Turning now to FIG. 7B, an image 720 is shown, illustrating lens foreign light probability within a particular region(s) of an image, according to one or more embodiments. As with FIG. 7A, the image 720 of FIG. 7B may comprise the first image 705a captured by the first optical sensor/camera unit having a wide FOV, and comprising Sun object 710 and tree object 715. Also as with FIG. 7A, the image 720 contains a foreign light region 710a, with center point 725, coinciding with the location of the sun in the image.

In some embodiments, a foreign light mask created over image 720 (e.g., according to the techniques described herein and with reference to FIGS. 4B and 5C, etc.) may be further modulated by the probability of foreign light being located in particular regions of the image. For example, if a bright point light source, e.g., Sun object 710, is identified in an image, it is fairly predictable that there might be a ring flare foreign light artifact at a certain distance, R, from the center 725 of the light source. For example, pixels located along dashed line ring, R1, at a first radial distance from the center 725 of the light source may have a first probability of being a foreign light pixel; pixels located along dashed line ring, R2, at a second radial distance from the center 725 of the light source may have a second (e.g., slightly lower) probability of being a foreign light pixel; and pixels located along dashed line ring, R3, at a third radial distance from the center 725 of the light source may have a third (e.g., even lower) probability of being a foreign light pixel. The values of these probabilities may be based on empirical studies, neural network training, artificial intelligence, etc. There may be yet other reasons (beyond the location of a bright point light source in the image) that the inherent probability of a pixel at a given location of being a foreign light pixel may be known. For example, sometimes a set of pixels 730 along the side of an image or a set of pixels 735 in the corner of an image may often show flaring in photos captured by a particular image capture device, due to, e.g., light reflecting off a capacitor or other component of the particular image capture device that is situated in proximity to one or more of the optical sensors of the image capture device. Further, if the two optical sensors/camera units of a given image capture device have FOVs that overlap, it may also be possible to predict foreign light location in one sensor unit based on where foreign light has been definitely located in the other sensor.

The image areas affected by foreign light also tend to have a specific color which depends on the imaging device, including the lens, used. In addition, such areas typically exhibit a lower contrast. In one embodiment, the color locus of foreign light pixels can be determined in a predetermined color space, e.g., by empirically analyzing multiple images affected by the foreign light. Based on this information, the disclosed techniques may determine the likelihood that any given pixel is affected by foreign light, e.g., by analyzing the color components of the pixel and/or the average gradient magnitude in a small spatial neighborhood around the pixel (which would be indicative of contrast level).

In still other embodiments, the probability of a given pixel being part of a foreign light region may be based, at least in part, on the number of its neighboring pixels that are exhibiting a foreign light artifact (i.e., the greater the number of pixels nearby that are exhibiting characteristics of foreign light artifacts, the greater the probability that the pixel in question may also be exhibiting a foreign light artifact).

In still other embodiments, the probability of a given pixel being part of a foreign light region may be based, at least in part, on the empirical study and image analysis of a number of previously captured images containing similar scenes with designated 'ground truth' foreign light regions. In other words, a neural network could be trained to recognize certain pixel patterns in images that are indicative of foreign light and increase the probabilities of pixels in incoming images having regions comparable to the types of regions that are recognized by the neural network as being indicative of foreign light.

Finally, if an image capture device had access to other device sensors, e.g., a GPS sensor, compass, accelerometer, gyrometer, etc., models could be developed to predict that when and where it might be more likely that a foreign light would be present in a particular region of the image based on one or more of the device sensor readings (e.g., if an image capture device is towards the West, while located in the Northern hemisphere, at 3 pm in the afternoon, and at 15 degrees above the horizon, the foreign light probability of all pixels may be boosted by an additional 20%). Further, an infrared sensor may also be used to detect the direction of a strong light source in the scene (and, thus, pixels more likely to be part of a foreign light region).

Once foreign light probabilities have been determined for one or more regions in the image, they may then be used to augment the determined foreign light mask, e.g., by multiplying each pixel in the foreign light mask with a confidence value for how probably the given pixel would be to be a foreign light pixel based on the determined one or more foreign light probabilities. In certain embodiments, the determined pixel foreign light probabilities could also be used in the foreign light mask creation phase, too, rather than simply modulating the foreign light mask after its creation.

Figure 8:
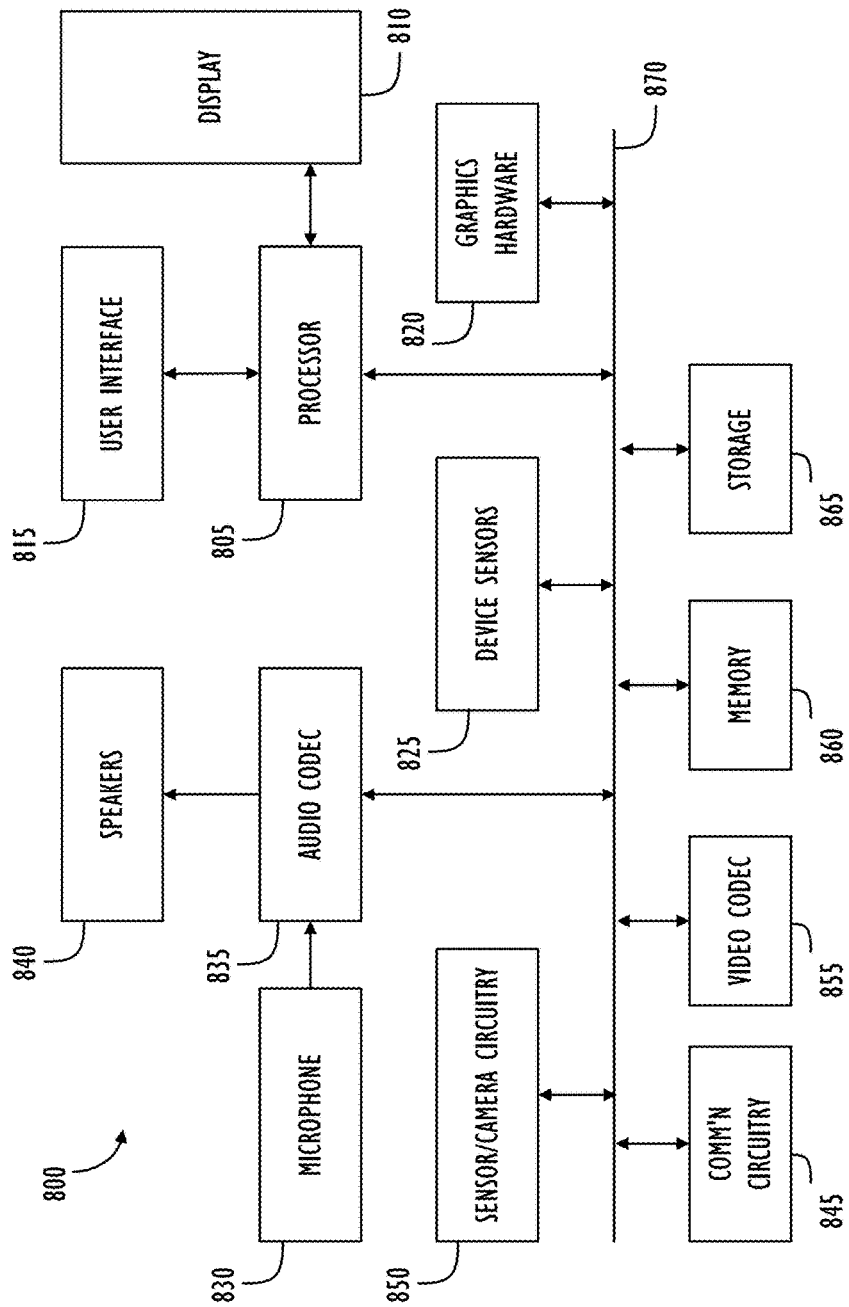
FIG. 8 is a block diagram illustrating a programmable imaging device in which one or more of the techniques disclosed herein may be implemented.

Referring to FIG. 8, a simplified functional block diagram of illustrative electronic device 800 is shown according to one embodiment. Electronic device 800 could be, for example, a mobile telephone, personal media device, portable camera, or a tablet, notebook or desktop computer system. As shown, electronic device 800 may include processor 805, display 810, user interface 815, graphics hardware 820, device sensors 825 (e.g., proximity sensor/ambient light sensor, accelerometer and/or gyroscope), microphone 830, audio codec(s) 835, speaker(s) 840, communications circuitry 845, image capture circuit or unit 850, which may, e.g., comprise multiple camera units/optical sensors having different characteristics, video codec(s) 855, memory 860, storage 865, and communications bus 870.

Processor 805 may execute instructions necessary to carry out or control the operation of many functions performed by device 800 (e.g., such as the generation and/or processing of images in accordance with the various embodiments described herein). Processor 805 may, for instance, drive display 810 and receive user input from user interface 815. User interface 815 can take a variety of forms, such as a button, keypad, dial, a click wheel, keyboard, display screen and/or a touch screen. User interface 815 could, for example, be the conduit through which a user may view a captured video stream and/or indicate particular frame(s) that the user would like to have a particular stabilization constraint(s) applied to (e.g., by clicking on a physical or virtual button at the moment the desired frame is being displayed on the device's display screen). In one embodiment, display 810 may display a video stream as it is captured while processor 805 and/or graphics hardware 820 and/or image capture circuitry contemporaneously generate a fused version of the captured video stream, storing the video stream in memory 860 and/or storage 865. Processor 805 may be a system-on-chip such as those found in mobile devices and include one or more dedicated graphics processing units (GPUs). Processor 805 may be based on reduced instruction-set computer (RISC) or complex instruction-set computer (CISC) architectures or any other suitable architecture and may include one or more processing cores. Graphics hardware 820 may be special purpose computational hardware for processing graphics and/or assisting processor 805 perform computational tasks. In one embodiment, graphics hardware 820 may include one or more programmable graphics processing units (GPUs).

Image capture circuitry 850 may comprise two or more camera units configured to capture images, e.g., at different zoom levels, which may be processed to generate a single fused image, in accordance with this disclosure. Output from image capture circuitry 850 may be processed, at least in part, by video codec(s) 855 and/or processor 805 and/or graphics hardware 820, and/or a dedicated image processing unit incorporated within circuitry 850. Images so captured may be stored in memory 860 and/or storage 865. Memory 860 may include one or more different types of media used by processor 805, graphics hardware 820, and image capture circuitry 850 to perform device functions. For example, memory 860 may include memory cache, read-only memory (ROM), and/or random access memory (RAM). Storage 865 may store media (e.g., audio, image and video files), computer program instructions or software, preference information, device profile information, and any other suitable data. Storage 865 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 860 and storage 865 may be used to retain computer program instructions or code organized into one or more modules and written in any desired computer programming language. When executed by, for example, processor 805 such computer program code may implement one or more of the methods described herein.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A non-transitory program storage device, readable by a programmable control device, comprising instructions stored thereon that, when executed, cause the programmable control device to:
   obtain a reference image and a non-reference image from an imaging system, wherein the reference image and non-reference image share an overlap region;
   determine whether there is at least one region comprising a mismatched foreign light effect present in the reference image;
   in response to a determination that there is at least one region comprising a mismatched foreign light effect present in the reference image, perform a foreign light mitigation operation, the foreign light mitigation operation comprising:
     determining a mask region within the overlap region, wherein the mask region comprises a region wherein a mismatched foreign light effect has been determined to be present in the reference image; and
     fusing the reference image and the non-reference image according to the determined mask region; and
   in response to a determination that there is not at least one region comprising a mismatched foreign light effect present in the reference image:
     fuse the reference image and the non-reference image without performing the foreign light mitigation operation.

2. The non-transitory program storage device of claim 1, wherein the imaging system comprises a first camera unit and a second camera unit.

3. The non-transitory program storage device of claim 2, wherein the reference image is obtained from the first camera unit and the non-reference image is obtained from the second camera unit.

4. The non-transitory program storage device of claim 1, further comprising instructions stored thereon for causing the programmable control device to:
   map values of pixels of the non-reference image to values of corresponding pixels of the reference image using a parameter,
   wherein the value of the parameter for a particular pixel indicates a likelihood that the particular pixel represents a mismatched foreign light effect between the reference image and the non-reference image at a location of the particular pixel.

5. The non-transitory program storage device of claim 1, wherein the instructions to determine whether there is at least one region comprising a mismatched foreign light effect present in the reference image further comprise instructions to perform one or more histogram matching operations on the reference image and the non-reference image.

6. The non-transitory program storage device of claim 1, wherein the instructions to determine the mask region further comprise instructions to perform one or more thresholding or morphological operations on values of one or more pixels in the overlap region.

7. The non-transitory program storage device of claim 1, wherein the instructions to determine the mask region further comprise instructions to modulate values of one or more pixels in the overlap region according to a determined foreign light probability value for the respective pixel.

8. The non-transitory program storage device of claim 1, wherein the instructions to fuse the reference image and the non-reference image according to the determined mask region further comprise instructions to:
fuse the reference image and the non-reference image according to a fusion confidence map,
wherein the fusion confidence map comprises a confidence value for each pixel in the non-reference image, the confidence value indicating a confidence with which the respective pixel should be fused with the corresponding pixel in the reference image.

9. The non-transitory program storage device of claim 1, wherein the instructions to fuse the reference image and the non-reference image according to the determined mask region further comprise instructions to omit the mask region of the non-reference image from the fusion.

10. An image capture device, comprising:
an imaging system;
a programmable control device; and
a memory coupled to the programmable control device, wherein instructions are stored in the memory, the instructions, when executed, causing the programmable control device to:
capture a reference image and a non-reference image using the imaging system, wherein the reference image and non-reference image share an overlap region;
determine whether there is at least one region comprising a mismatched foreign light effect present in the reference image;
in response to a determination that there is at least one region comprising a mismatched foreign light effect present in the reference image, perform a foreign light mitigation operation, the foreign light mitigation operation comprising:
determining a mask region within the overlap region, wherein the mask region comprises a region wherein a mismatched foreign light effect has been determined to be present in the reference image; and
fusing the reference image and the non-reference image according to the determined mask region; and
in response to a determination that there is not at least one region comprising a mismatched foreign light effect present in the reference image:
fuse the reference image and the non-reference image without performing the foreign light mitigation operation.

11. The image capture device of claim 10, wherein the imaging system comprises a first camera unit and a second camera unit.

12. The image capture device of claim 11, wherein the reference image is obtained from the first camera unit and the non-reference image is obtained from the second camera unit.

13. The image capture device of claim 10, further comprising instructions stored in the memory for causing the programmable control device to:
map values of pixels of the non-reference image to values of corresponding pixels of the reference image using a parameter,
wherein the value of the parameter for a particular pixel indicates a likelihood that the particular pixel represents a mismatched foreign light effect between the reference image and the non-reference image at a location of the particular pixel.

14. The image capture device of claim 10, wherein the instructions to determine whether there is at least one region comprising a mismatched foreign light effect present in the reference image further comprise instructions to perform one or more histogram matching operations on the reference image and the non-reference image.

15. The image capture device of claim 10, wherein the instructions to determine the mask region further comprise instructions to perform one or more thresholding or morphological operations on values of one or more pixels in the overlap region.

16. The image capture device of claim 10, wherein the instructions to determine the mask region further comprise instructions to modulate values of one or more pixels in the overlap region according to a determined foreign light probability value for the respective pixel.

17. The image capture device of claim 10, wherein the instructions to fuse the reference image and the non-reference image according to the determined mask region further comprise instructions to:
fuse the reference image and the non-reference image according to a fusion confidence map,
wherein the fusion confidence map comprises a confidence value for each pixel in the non-reference image, the confidence value indicating a confidence with which the respective pixel should be fused with the corresponding pixel in the reference image.

18. The image capture device of claim 10, wherein the instructions to fuse the reference image and the non-reference image according to the determined mask region further comprise instructions to omit the mask region of the non-reference image from the fusion.

19. An image fusion method, comprising:
obtaining a reference image and a non-reference image using an imaging system, wherein the reference image and non-reference image share an overlap region;
determining whether there is at least one region comprising a mismatched foreign light effect present in the reference image;
in response to determining that there is at least one region comprising a mismatched foreign light effect present in the reference image, perform a foreign light mitigation operation, the foreign light mitigation operation comprising:
determining a mask region within the overlap region, wherein the mask region comprises a region wherein a mismatched foreign light effect has been determined to be present in the reference image; and fusing the reference image and the non-reference image according to the determined mask region; and in response to determining that there is not at least one region comprising a mismatched foreign light effect present in the reference image:

fusing the reference image and the non-reference image without performing the foreign light mitigation operation.

20. The method of claim 19, further comprising:

mapping values of pixels of the non-reference image to values of corresponding pixels of the reference image using a parameter, wherein the value of the parameter for a particular pixel indicates a likelihood that the particular pixel represents a mismatched foreign light effect between the reference image and the non-reference image at a location of the particular pixel.

21. The method of claim 19, wherein the act of determining whether there is at least one region comprising a mismatched foreign light effect present in the reference image further comprises performing one or more histogram matching operations on the reference image and the non-reference image.

22. The method of claim 19, wherein the act of determining the mask region further comprises modulating values of one or more pixels in the overlap region according to a determined foreign light probability value for the respective pixel.

23. The method of claim 19, wherein the act of fusing the reference image and the non-reference image according to the determined mask region further comprises:

fusing the reference image and the non-reference image according to a fusion confidence map, wherein the fusion confidence map comprises a confidence value for each pixel in the non-reference image, the confidence value indicating a confidence with which the respective pixel should be fused with the corresponding pixel in the reference image.

24. The method of claim 19, wherein the act of fusing the reference image and the non-reference image according to the determined mask region further comprises omitting the mask region of the non-reference image from the act of fusing.

* * * * *